C. G. Dickinson.
Harvester Rake.

No. 4,377. Reissued May 9. 1871.

Witnesses.
Chas. Lessieson
Edmund Masson

Chas. G. Dickinson Assignor to J. Russell Parsons.
By Attorney A. B. Stoughton.

N. PETERS, PHOTO-LITHOGRAPHER, WASHINGTON, D. C.

United States Patent Office.

J. RUSSELL PARSONS, OF HOOSICK FALLS, ASSIGNEE, BY MESNE ASSIGNMENTS, OF CHARLES G. DICKINSON, OF POUGHKEEPSIE, NEW YORK.

Letters Patent No. 22,786, dated February 1, 1859; reissue No. 4,377, dated May 9, 1871.

IMPROVEMENT IN HARVESTER-RAKES.

The Schedule referred to in these Letters Patent and making part of the same.

*To all whom it may concern:*

Be it known that CHARLES G. DICKINSON, of the city of Poughkeepsie, in the county of Dutchess and State of New York, did invent a new and useful Improvement in the Raking Attachment to a Harvester; and that the following is a full, clear, and exact description of the same, reference being had to the accompanying drawing making a part of this specification, in which—

Figure 1:
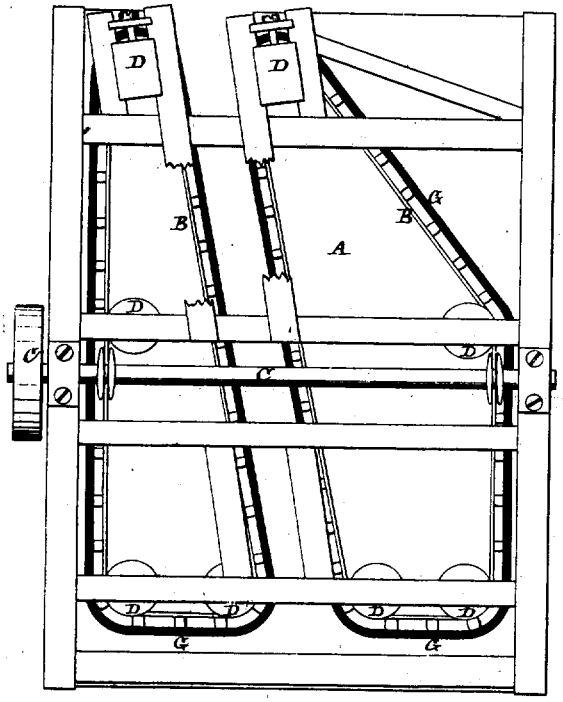
Figure 1 represents a plan of the under side of the platform and gathering and delivering mechanism as seen from the under side.
Figure 2:
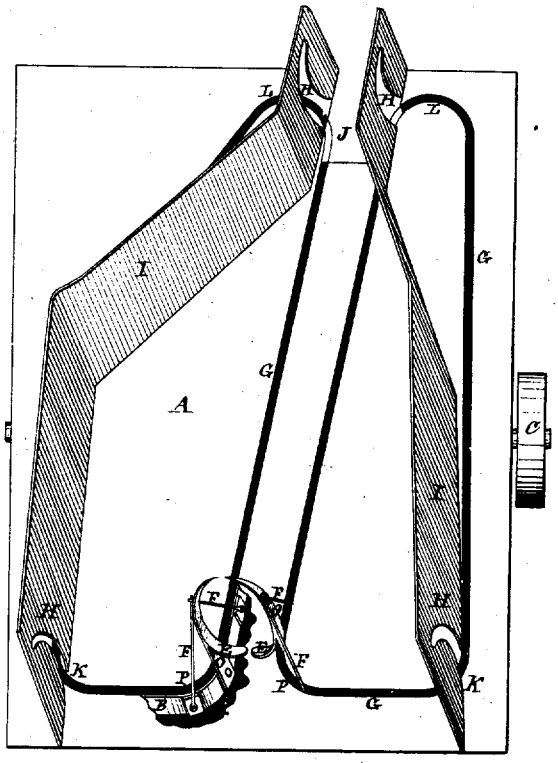
Figure 2 represents a view of the upper side of the platform of a harvester, with the gathering and delivering mechanism shown thereon.
Figure 3:
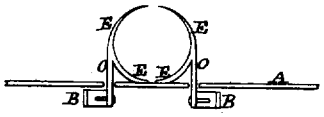
Figure 3 represents, in elevation, the position of the arms and their attachment to the endless chain or belt, and also the curved foot attached to each arm when the gavel has been compressed ready to move off to the delivery.

This invention relates to a gathering, gaveling, and delivering apparatus, which first moves along parallel with the front of the platform to gather the cut grain, and, then compressing it and holding it compressed, carries it in a line oblique to the front of the platform, and delivers the gavel on the ground clear of the track of the harvester.

To enable others skilled in the art to make and use my invention, I will proceed to describe the same in connection with the drawing.

A is the platform on which the cut grain is received, and furnished with sides or curb, I, through which openings, H, are made, for the gatherers and holders to pass through in making their circuit.

The sides I stand nearly parallel with the outer edge of the platform for about one-half of the length of the platform, and then converging, but not at the same angle, to an opening, J, in the rear end of the platform of sufficient size or capacity to allow the passage of a gavel between the sides and through the platform.

In the platform are made slots, G, and extending from the rear of the same to near the front thereof, where the slots curve as at K, pass through the curb and along the front of the platform to near its center and leaving a space between sufficient to hold a gavel; and thence curve again, as at P, and extend parallel with each other diagonally from the front to the rear of the platform, where the gavel is delivered on the ground clear of the track of the harvester.

On the under side of the platform are two endless chains or belts, B, which are moved by power from a harvesting-machine, by a pulley on either side attached to a shaft, C; and to the endless chain or belts are attached two upright arms, O, suitably curved to gather and compress the gavel and carry the same to the delivery.

Braces or compressors, E, having an eye in their tops, are attached to the endless chain or belt fore and aft of each upright arm, and pass up through the slots, and are connected by the eye to the arms near the top.

These braces or compressors are designed to brace the arms, and also to aid in gathering and compressing the gavel and holding the same in compact form while passing to the delivery point on the inside of each arm, and so curved as to pass close to the deck of the platform and under the cut grain, nearly meeting under the gavel, when the same is compressed ready to be carried off to delivery.

The belts B are passed directly under the slots G, and, by passing around small pulleys, D, are made to follow the slots and carry the arms through the slots; these chains or belts being so arranged as to move the arms to the position for compressing the grain at the same time and place, and to open at the time and place where the gavel is to be delivered.

Thus the grain is gathered, compressed into a gavel, and moved in its compact form to the delivery point, and there dropped upon the ground, and in being moved from the point or place where it is gaveled to the place where it is delivered it is carried in a line oblique to the front of the platform and to one side of a line or plane passing through the point where it is gaveled.

In the construction of the raking attachment the platform is attached to a harvesting-machine, and power is obtained to work it from the harvester driving-pulley.

The harvester and platform moving together, the grain as it is cut falls upon the front of the platform across the slots G.

The arms O are moved along toward the front of the platform and, turning at K, pass through the openings H, and moving toward each other along the front of the platform, commence gathering and compressing the grain lying and still falling across the slots; and having arrived at the points P, turn and bring the arms together; and having compressed the gavel, the arms pass on, following the diagonal slots from front to rear of platform; and having arrived at the opening J, the arms open at this point and allow the gavel to drop upon the ground clear of the track of the harvester, and then continue on for another operation.

Having thus fully described the invention of the said CHARLES G. DICKINSON,

What is claimed therein as new is—

A gathering, gaveling, and delivering apparatus, substantially as described, connected with and operated by the gears of a harvesting-machine, and which first moves along parallel with the front of the platform to gather the cut grain, and then, compressing it and holding it compressed, carries it in a line oblique to the front of the platform, and delivers the gavel on the ground clear of the harvester.

J. RUSSELL PARSONS.

Witnesses:

A. B. STOUGHTON,

JOHN E. WILCOX.